(No Model.) 2 Sheets—Sheet 1.
M. HUNTLY.
TRUCK.
No. 385,181. Patented June 26, 1888.
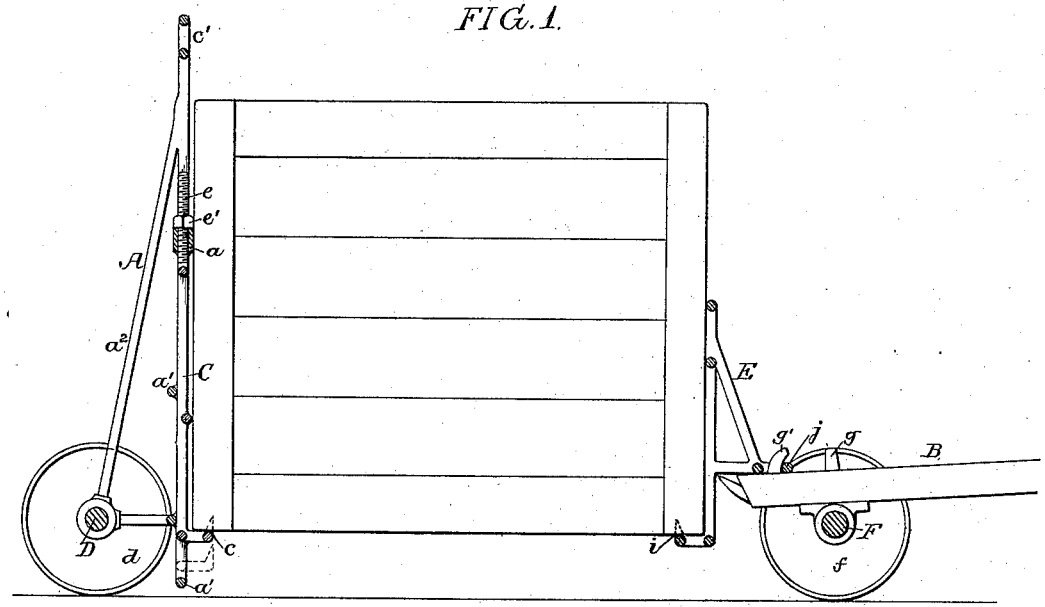
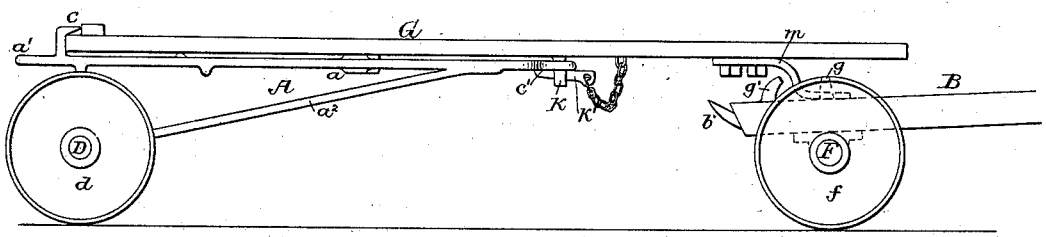
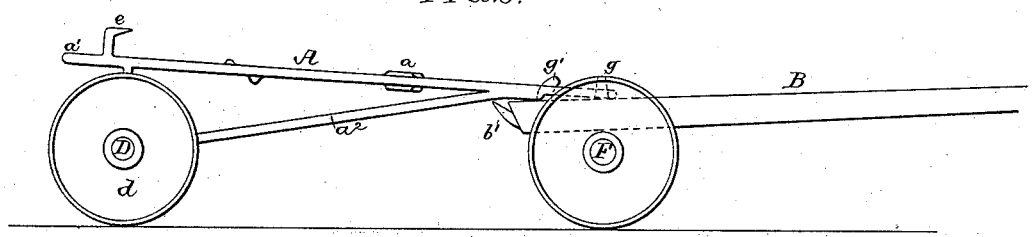
Witnesses.
Hamilton D. Turner.
William D. Conner.
Inventor,
Maurice Huntly.
By his Attorneys,
Howson & Howson (No Model.) 2 Sheets—Sheet 2.

M. HUNTLY.
TRUCK.

No. 385,181. Patented June 26, 1888.

Witnesses:
Hamilton D. Turner.
William D. Connero.

Inventor:
Maurice Huntly,
by his Attorneys.
Howson & Howson

United States Patent Office.

MAURICE HUNTLY, OF PHILADELPHIA, PENNSYLVANIA.

TRUCK.

SPECIFICATION forming part of Letters Patent No. 385,181, dated June 26, 1888.

Application filed November 29, 1887. Serial No. 256,440. (No model.)

*To all whom it may concern:*

Be it known that I, MAURICE HUNTLY, a citizen of the United States, and a resident of Philadelphia, Pennsylvania, have invented an Improved Combination-Truck, of which the following is a specification.

The object of my invention is to construct a simple and effective form of truck for moving heavy loads—such as large boxes, heavy machinery, &c.—the truck being intended not so much for street use as for moving heavy articles in factories, warehouses, stores, and depots.

Figure 5:
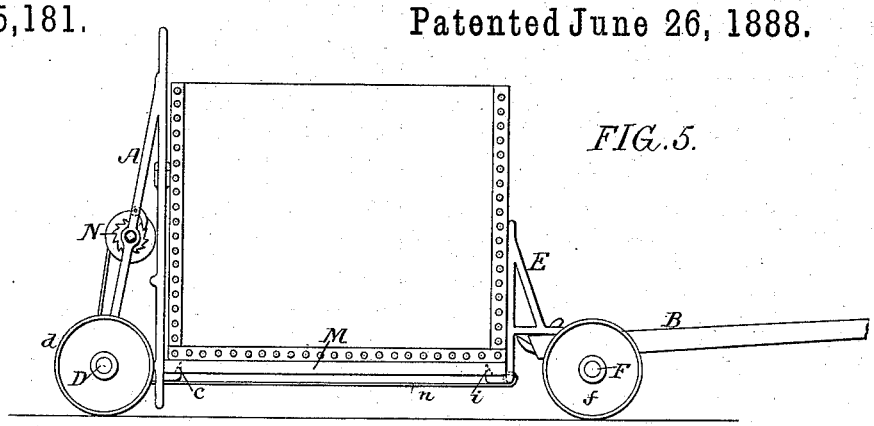
Figure 4:
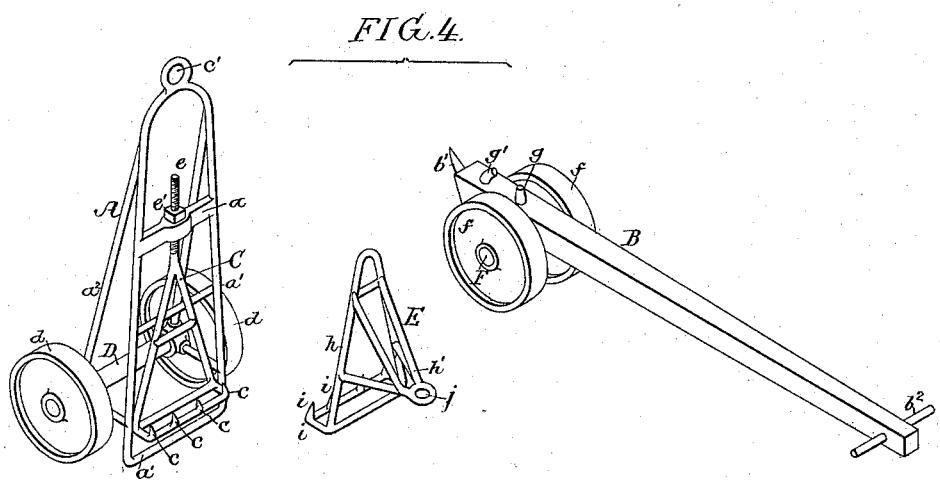
Figure 6:
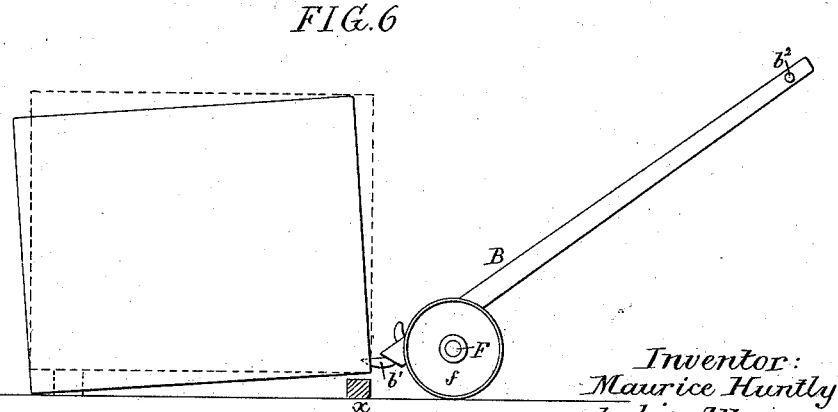

In the accompanying drawings, Figure 1 is a sectional view of my improved truck secured to and carrying a box. Fig. 2 is a view showing the truck adapted for supporting a platform. Fig. 3 is a view showing the mode of connecting the parts of the truck when no load has to be carried. Fig. 4 is a perspective view of the parts of the truck detached from each other. Fig. 5 is a view showing a special adaptation of the truck, and Fig. 6 is a diagram illustrating one of the features of my invention.

Trucks for transporting heavy machinery and heavy boxes of goods have been made in the form of four-wheeled platforms, or boxes or machinery have been moved from place to place by means of rollers, levers, and like appliances.

One of the main features of my invention is the formation of a truck in sections, so that one or more of the parts can be used in lifting the article to be transported to such a position that the truck can be readily applied thereto.

In referring to Figs. 1 and 4, A is the rear portion of the truck, having an axle, D, and two wheels, $d$, having wide flanges, as shown in Fig. 4, the frame-work of this portion of the truck being preferably made of round iron or steel. On the frame A is adapted to slide a lifter, C, having a foot with a number of sharp projections or claws, $c$, said foot projecting beyond the face of the frame A, as shown in Fig. 1. The lifter C has a threaded bolt, $e$, to which is adapted a nut, $e'$, having its bearing on a cross-bar, $a$, of the frame A, through which the bolt $e$ passes, so that by turning the nut $e'$ the lifter may be raised or lowered. The frame A has suitable cross stays, $a'$, and rear braces, $a^2$, for the purpose of strengthening said frame at the points required; and at the end of the frame is an eye, $c'$, which is adapted to fit over a pin, $g$, on the front portion, B, of the truck, as shown in Fig. 3, when it is desired to move the truck from one place to another without load.

The front portion, B, of the truck is in the form of a crow-bar or lever, the short arm of which has a pike, $b'$, and the long arm a suitable handle, which in the present instance is in the form of a cross-bar, $b^2$, the lever being mounted on a suitable axle, F, provided with two flanged wheels, $f f$.

The lever B is provided with two pins, $g\ g'$, the former serving to connect the portion A of the truck to the lever, as described above, and also as a pivotal connection between the lever and a platform, when the latter is used, as shown in Fig. 2.

E is the third member of the truck, which is preferably in the form of a skeleton frame, as shown in Fig. 4, said frame comprising an upright portion, $h$, having a bracket, $h'$, with eye $j$, adapted to the pin $g'$ on the lever B. At the bottom of the frame E is a foot, $i$, with sharp pins or claws $i'$, of the same character as the claws $c$ of the lifter C.

To move a large and heavy box I proceed as follows: The box being on the floor, the first operation necessary is to block it up, in order to get the claws of the truck under the edges of the box. The pike $b'$ of the lever B is therefore thrust into the side of the box sufficiently to obtain a firm hold, and by depressing the long arm of the lever the box is lifted, as shown in Fig. 6, and suitable blocks, $x$, placed under each corner of the box, the opposite side being then raised and blocked up in like manner, as shown by dotted lines in Fig. 6. The nut $e'$ on the bolt $e$ is then unscrewed until the claws $c$ of the lifter C are in position to pass under the box, the lifter being then raised, so as to force its claws $c$ into the bottom of the box and thus securely fasten the frame A thereto, the nut being further turned until the box is lifted clear of the supporting-blocks. After the frame A has been suitably adjusted and secured the frame E is applied to the opposite end of the box, the claws $i$ passing under the same. The pin $g'$ of the lever B is then inserted in the eye j of the frame E, and the handle of the lever is depressed, thus raising the frame, forcing the points i into the bottom of the box and lifting the box clear of its supporting-blocks.

The parts A B and E now form practically a four-wheeled truck, with pivoted front wheels, and the box can be moved to any point or position desired, and when it reaches its destination it can be readily lowered onto the floor by a reversal of the above-described operations. When returning for another load, the frame A and lever B can be coupled together, as shown in Fig. 3, and the frame E can be placed upon the frame A.

When the truck is not required for heavy or cumbersome loads, it may be transformed into a platform-truck, as shown in Fig. 2. In this case the frame A is turned to a horizontal position, and the platform rests partly on said frame, one end of the platform G bearing against the foot of the lifter C and being locked in position by the engagement of the eye c' of the frame A with a pin, k, on the under side of the platform G, the two being secured by a suitable key or wedge, k'. On the under side of the front portion of the platform G is a plate, m, having an opening, through which passes the pivot-pin g of the lever B of the truck.

Where it is necessary to move metal tanks or machinery having metal bases, I use a platform, M, of wood, as shown in Fig. 5, the claws c and i engaging with this platform, and the two frames A and E being tied together by means of a rope or chain, n, connected at one end to the frame and passing at the opposite end around the shaft D and up to a drum, N, on the frame A, the drum being provided with a spindle having a squared end for receiving a handle, and also with a ratchet, with which a pawl on the frame engages. By turning the drum N, therefore, the rope or chain may be tightened and the two portions A and E of the truck firmly retained in their proper relative positions.

I claim as my invention—

1. The combination, in a truck, of a wheeled support consisting of a frame-work having a portion adapted to pass under the object to be carried and another portion adapted to press against one end of the object, with a lever mounted on wheels and with a frame adapted to be supported by said lever, and having a portion adapted to bear against the other end of the object to be carried, and a portion passing under said object, so that on raising the lever the object is supported by the two end frames, substantially as specified.

2. The combination, in a truck, of the frame A and wheels therefor, with claws C passing under the object to be carried, with a frame, E, at the opposite end, having claws i, with a carrying-truck for this frame E, substantially as described.

3. The combination of the frame A, with the frame E and its carrying-truck B, and a roller, C, sliding on the frame A, and having claws which engage with the object to be carried, substantially as described.

4. The combination of the frame A, carrying-wheels therefor, with a frame, C, adapted to slide on said frame E, and provided at one end with a threaded bolt, which passes through a portion of the frame A, and a nut by which the frame C is hung upon the frame A, substantially as described.

5. The combination of the frame, the rear carrying-frame, A, having wheels and having an eye, c', with the front truck, B, having wheels, and a pin over which the eye of the rear truck passes when the two are connected, substantially as described.

6. The combination of the wheeled rear frame, A, having an eye, c', with a wheeled front truck, B, having a pivot-pin, with a platform, G, having a portion adapted to pass over the said pivot-pin, and a pin adapted to pass through the eye c' in the rear truck, substantially as specified.

7. The combination of the front truck, the wheels, the shaft, a crow-bar, b, forming the handle for said truck, and a pivot-pin thereon, with a pike, b', substantially as described.

8. The combination of the rear truck, A, mounted on wheels, having a portion adapted to pass under the object to be carried, with a front truck, and a frame, E, thereon, having a portion adapted to pass under the object to be carried, with a cord or chain passing from the front frame, E, to a windlass on the frame A, substantially as described.

In testimony whereof I have signed my name to this specification in the presence of two subscribing witnesses.

MAURICE HUNTLY.

Witnesses:
HENRY HOWSON,
HARRY SMITH.